(12) United States Patent
Külls et al.

(10) Patent No.: US 9,063,167 B2
(45) Date of Patent: Jun. 23, 2015

(54) PIEZORESISTIVE TRANSDUCER

(75) Inventors: Robert Külls, Detmold (DE); Siegfried Nau, Müllheim (DE)

(73) Assignee: FRAUNHOFER-GESELLSCHAFT ZUR, Munich (DE)

( * ) Notice: Subject to any disclaimer, the term of this patent is extended or adjusted under 35 U.S.C. 154(b) by 337 days.

(21) Appl. No.: 13/583,298

(22) PCT Filed: Feb. 28, 2011

(86) PCT No.: PCT/EP2011/000975
§ 371 (c)(1),
(2), (4) Date: Sep. 7, 2012

(87) PCT Pub. No.: WO2011/110295
PCT Pub. Date: Sep. 15, 2011

(65) Prior Publication Data
US 2013/0042687 A1 Feb. 21, 2013

(30) Foreign Application Priority Data
Mar. 10, 2010 (DE) .......................... 10 2010 010 931

(51) Int. Cl.
*G01P 15/12* (2006.01)
(52) U.S. Cl.
CPC .................................... *G01P 15/123* (2013.01)
(58) Field of Classification Search
CPC ... G01P 15/123; G01P 15/18; G01P 15/0802; G01P 15/12
USPC ............... 73/514.33, 514.29, 514.36, 862.59; 338/2, 3, 5
See application file for complete search history.

(56) References Cited

U.S. PATENT DOCUMENTS

| | | | | |
|---|---|---|---|---|
| 4,104,920 A * | 8/1978 | Albert et al. | ............... | 73/514.14 |
| 4,605,919 A | 8/1986 | Wilner | | |
| 4,689,600 A | 8/1987 | Wilner | | |
| 4,809,552 A * | 3/1989 | Johnson | ...................... | 73/514.33 |
| 4,879,914 A * | 11/1989 | Norling | ...................... | 73/862.59 |
| 5,539,236 A | 7/1996 | Kurtz et al. | | |
| 6,389,898 B1 * | 5/2002 | Seidel et al. | ............... | 73/514.29 |
| 6,453,744 B2 * | 9/2002 | Williams | ................... | 73/504.12 |
| 6,564,637 B1 * | 5/2003 | Schalk et al. | ............... | 73/504.12 |
| 6,584,864 B2 * | 7/2003 | Greenwood | ............... | 73/862.59 |
| 6,684,699 B1 * | 2/2004 | Lapadatu et al. | .......... | 73/514.29 |
| 8,156,807 B2 * | 4/2012 | Robert | ...................... | 73/514.29 |
| 8,371,166 B2 * | 2/2013 | Robert | ...................... | 73/514.29 |
| 2005/0034542 A1 | 2/2005 | Thaysen | | |

(Continued)

FOREIGN PATENT DOCUMENTS

| | | |
|---|---|---|
| DE | 1 447 115 A1 | 11/1968 |
| EP | 2 008 965 A2 | 12/2008 |
| GB | 1041744 | 9/1966 |
| WO | WO 92/15018 | 9/1992 |

*Primary Examiner* — Helen Kwok
(74) *Attorney, Agent, or Firm* — Fitch Even Tabin & Flannery (57) ABSTRACT

A piezoresistive transducer is disclosed having a framework including a support element attached to a bending element that undergoes a deformation relative to the support element when a force acts on the bending element including a neutral fiber whose length does not change during the deformation. At least one piezoresistive expansion body is attached to the support element that exhibits a piezoresistive material and converts the deformation of the bending element into an electrically detectable change in resistance.

23 Claims, 3 Drawing Sheets

(56) References Cited

U.S. PATENT DOCUMENTS

2006/0117871 A1 6/2006 Wilner
2006/0130596 A1 6/2006 Wilner
2008/0314148 A1* 12/2008 Robert ............... 73/514.33
2009/0139342 A1* 6/2009 Robert et al. ............ 73/818
2010/0186510 A1* 7/2010 Robert ............... 73/514.29

* cited by examiner

PIEZORESISTIVE TRANSDUCER

CROSS-REFERENCE TO RELATED APPLICATION

Reference is made to EP Application No. 10 2010 010 931.2, entitled "Piezoresistive Transducer", filed on Mar. 10, 2011 and PCT/EP2011/00975, filed on Feb. 28, 2011, which applications are incorporated herein by reference in their entirety.

BACKGROUND OF THE INVENTION

The invention relates to a piezoresistive transducer with a framework having a support element, attached to which is a bending element that undergoes a deformation relative to the support element when a force acts on it, which has a neutral fiber whose length does not change during the deformation, and attached to which is an expansion body that exhibits a piezoresistive effect and converts the deformation of the bending element into an electrically detectable change in resistance.

DESCRIPTION OF THE PRIOR ART

There are numerous embodiments of transducers that convert mechanical variables, such as acceleration, force, expansion or pressure, into an electrically detectable variable, such as, for example a change in resistance. One frequently employed principle here involves utilizing the piezoresistive effect, in which the expansion of an expansion body comprised of electrically conductive or semiconducting material leads to a change in resistance of the latter. Out of physical necessity, all known transducers of this type have at least one bending element for mechanically recording the measured variable, at least one expansion body as the piezoresistive element for converting the deformation of the bending element into an electrically detectable change in resistance, and at least one support. The aforementioned elements comprise a mechanical framework that exhibits more or less complexity, depending on the design. The transducers often also contain one or more additional counterweights that are attached to the bending element.

In the interests of providing a more comprehensible description, the frameworks described below will always be portrayed and explained using precisely one support element, precisely one bending element and a number of piezoresistive elements. This does not imply that the following descriptions do not encompass transducers with a framework made up of several supports or several bending elements, or only one or especially many piezoresistive elements, or all of these properties.

An expert is fully aware that strictly differentiating the framework of piezoresistive transducers into a support, a bending element and a piezoresistive element represents a simplification. All the above-mentioned elements basically possess the inherent properties of a bending element, that is, all of these elements have a limited rigidity, which counteracts a force that displaces the framework from of its resting position. This fact notwithstanding, an expert can identify the individual elements in a piezoresistive transducer, and delineate them from each other. For this reason, the strict separation between the mentioned elements can be retained below, so that the principle underlying the invention can thus be formulated with precision and clarity.

A piezoresistive transducer exhibits various quality features. The most important feature is sensitivity, which indicates how much the resistance of the piezoresistive element changes at a given measured variable. Additional basic features include the mechanical stability, along with the lowest mechanical eigenfrequency of the framework, and hence the bandwidth of the transducer. The bandwidth of a transducer determines how high or low the variability of a measured variable can be, so that the transducer can essentially correctly reflect this measured variable.

All metals and many semiconductors exhibit this piezoresistive effect. The latter is quantified for a given material by establishing the ratio between its relative change in resistance and its expansion. This ratio is referred to as the k-factor. A higher k-factor means that the resistance of a material is highly variable at a given expansion of the material, that is, the material is very sensitive. Metals have k-factors ranging from 2 to 6, while semiconductors can have k-factors that well exceed 100. Therefore, it is advantageous to manufacture the piezoresistive element of a piezoresistive transducer out of a semiconductor material like doped silicon, silicon carbide, diamond, gallium nitride, derivatives of gallium nitride or other III-V semiconductors, and seek a high k-factor in the process.

Among other things, the mechanical stability of a piezoelectric transducer depends on how stably its individual elements are connected with each other and with the support. According to prior art, the framework comprised of a support, bending element and piezoresistive element can be connected either by joining techniques, such as adhesive bonding, bolting or related joining techniques, or the mentioned framework is monolithically fabricated. A monolithic composite of individual components implies that the stability of the joining surfaces of the sub-elements are only negligibly smaller than the stability of any surface of the element as a whole. Negligibly implies that these joining surfaces do not constitute any predetermined breaking points. "Monolithic" can alternatively or additionally be any joining surface between the sub-elements which is a uniform and direct atomic bond over the entire joining surface, in terms of a covalent, ionic or metallic bond.

Monolithic fabrication is advantageous from the stability of the mentioned framework, but not necessary, since weak spots that might arise when joining individual sub-elements are avoided in this way.

In order to satisfy the requirement for a high sensitivity and high mechanical stability, numerous prior art piezoresistive transducers are monolithically fabricated, with a piezoresistive element comprised of a semiconductor material having a high k-factor. For a given material, these transducers differ primarily in the geometry of the framework of the support, bending element and piezoresistive element. These differences in the geometry of the framework are determinative of the differences between the aforesaid piezoresistive transducers in terms of quality features.

The prior art contains at least two geometric basic principles for the formation of a framework of a monolithic transducer fabricated with a piezoresistive element comprised of a semiconductor material. The first principle will be briefly outlined with reference to the basic structure illustrated in FIG. 1 for the design of a piezoresistive transducer. The piezoresistive element is imbedded in the bending element 2, which is fixed on the support 3. The measured variable works in the direction of the arrow 4. The neutral fiber 6 of the bending element 2 is delineated by way of orientation, and denotes the location at which compressive and tensile stresses within the bending element cancel each other out during deformation. An expert recognizes that use of the counterweight 5 is optional, and does not change the geometric principle.

Figure 2:
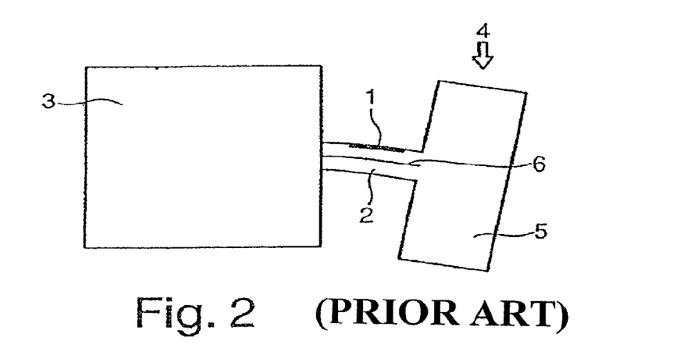
FIG. 2 is a schematic diagram of a transducer according to the prior art.
Figure 3:
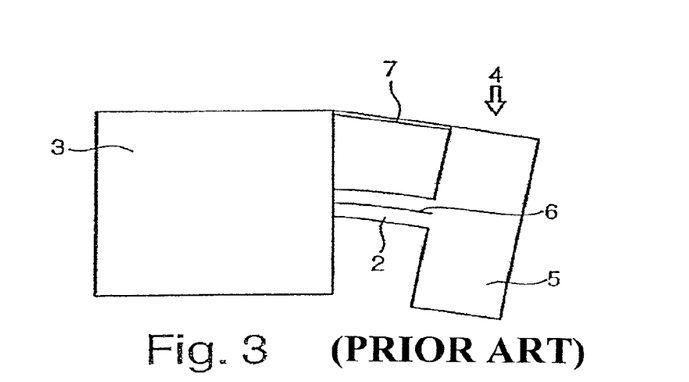
FIG. 3 is a schematic diagram of a transducer according to the prior art.

In the second principle illustrated in FIG. 3, the piezoresistive element 7 is an unsupported element between the support 3 and weight 5. Otherwise, the framework is designed identically to the one in FIG. 2. Attaching the piezoresistive element 7 as illustrated allows it to be fixed in place further away from the neutral fiber 6, so that a distinctly higher expansion occurs along the piezoresistive element 7 when exposed to the same measured variable 4 of the bending element 2 as on FIG. 2, making it possible to achieve a higher sensitivity given an identical mechanical eigenfrequency.

All frameworks of monolithic piezoresistive transducers are believed to be equipped with a piezoresistive element comprised of a semiconductor material and can be attributed to the two basic structures described above according to FIGS. 2 and 3. The first geometric principle of FIG. 2 is an industry standard because it is technically easy to realize, wherein there are countless embodiments thereof in existence. The second geometric principle of FIG. 3 is a great deal more complicated to fabricate due to the unsupported piezoresistive element, and thus is not as widespread.

The following publications each describe a piezoresistive acceleration sensor, which is based on the second principle of FIG. 3 which are: U.S. Pat. Nos. 5,539,236, 4,605,919, and 4,689,600, U.S. Published Application 2006/130596 and WO 9215018. In the known cases, two elements which are arranged so that they can move relative to each other over a joining region with a narrowed design, are joined together as a single piece, and have between them a trench structure, which is bridged by an expansion body of a piezoresistive material. In U.S. Pat. Nos. 4,605,919 and 4,689,600, WO 92/15018 and U.S. Published Application 2006/0117871, the piezoresistive expansion body spanning the trench structure is largely unsupported, but is in all known cases oriented parallel to the neutral fiber of the bending element, which represents the narrowed joining region between both movable elements.

SUMMARY OF THE INVENTION

The invention is a piezoresistive transducer with a framework having a support element, attached to which is a bending element that undergoes a deformation relative to the support element when a force acts on it, which has a neutral fiber whose length does not change during the deformation, and attached to which is an expansion body including a piezoresistive material which converts the deformation of the bending element into an electrically detectable change in resistance so that the transducer is as sensitive as possible.

The piezoresistive transducer according to FIG. 3, is assembled based on the second principle explained above, and is configured to improve the sensitivity, that is, metrological detectability of a deformation along the bending element caused by acceleration forces. As known, the change in electrical resistance in a piezoresistive element behaves monotonously to the expansion of the piezoresistive element. That is, given an expansion of the piezoresistive element in one direction, its electrical resistance also changes in only one direction. Therefore, the sensitivity of the piezoresistive transducer is a maximal when the expansion of the piezoresistive element is a maximal for a given measured variable. For this reason, the piezoresistive element serving as the expansion body is in the present case attached to a location of the framework geometry that is exposed in relation to the potential expansion, that is, as far away as possible from the bending element. However, this requires that at least one extra auxiliary component or weight to be attached to the bending element to secure the expansion body.

The piezoresistive transducer basically makes use of the above known transducer, but dispenses with the necessity of providing an additional component or weight joined with the bending element. Based on the invention, a piezoresistive transducer has the support element and bending element at least regionally bordering a gap on at least two sides. At least one expansion body is provided, which locally joins the support element and bending element in the region of the gap in a bridge and unsupported manner. The at least one expansion body has a longitudinal extension that intersects the neutral fiber of the bending element at an angle α ranging between 35° and 145°. It is particularly advantageous for the expansion body to be situated perpendicular to the neutral fiber, that is, α=90°.

As opposed to the previously known piezoresistive transducers and as explained above, the expansion body does not extend along, that is, parallel to the neutral fiber of the bending element. Instead, it is unsupported relative to the neutral fiber of the bending element and is disposed perpendicular thereto. However, this requires a special design of the framework which has the support element joined to bending element joined thereto, which together bracket a gap with each other that is bridged by at least one expansion body. When an external force acts on the framework to displace the bending element, the expansion body does not undergo any significant bending transverse to the expansion body's longitudinal extension and is stretched or clinched along the expansion body's longitudinal extension, resulting in a maximum electrically detectable change in resistance. In the transducer according to the invention, the expansion or deformation of the expansion body is greater than in the case of an expansion body oriented along the length of the bending element while exposed to an otherwise identical force. This is especially the case since the displacement of the bending element is converted directly into an expansion of the expansion body, occurring primarily along its expansion body longitudinal extension, which is associated with a maximum achievable electrically detectable change in resistance.

The expansion body preferably is made completely out of a transducer material, that is, a piezoresistive material, which ensures the highest possible sensitivity in particular when the expansion body undergoes a maximum change in length while exposed to both expansion and clinching. This means that it has to be designed in such a way as to not experience any evasive deformation, for example lateral bending, bulging or "snapping back", transverse to the loading direction, in particular during exposure to a clinching load. A potential evasive deformation can be minimized by making the expansion body especially stable in design from a mechanical standpoint, for example giving it a small length to cross section ratio and/or using a particularly stable, if necessary even monolithically integratable material, such as silicon or other crystalline materials.

It should be noted that a "neutral fiber" in accordance with the invention does not necessarily require a location limited to inside the material or substance comprising the bending element or used in its manufacture. Bending element structures are possible in which the neutral fiber also is located outside the actual material of the bending element, in the form of a so-called "virtual" neutral fiber, for example in the case of a bending element structure having at least two braces running parallel to each other.

To further explain the piezoresistive transducer according to the invention, reference is made to the following exemplary embodiments illustrated on the figures, whose specific configurations are not intended to limit the general inventive idea.

BRIEF DESCRIPTION OF THE DRAWINGS

The invention will be exemplarily described below based on exemplary embodiments without limiting the general inventive idea, wherein reference is made to the drawings. Shown on.

DESCRIPTION OF THE PREFERRED EMBODIMENTS

Figure 1:
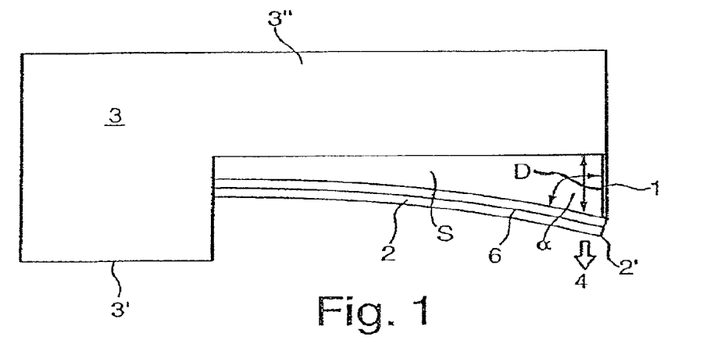
FIG. 1 is a basic structure for describing a piezoresistive transducer according to the invention.

FIG. 1 illustrates a longitudinal section through the framework of a piezoresistive transducer according to the invention. The framework of the piezoresistive transducer has a stable support element 3, whose longitudinal section is "L" shaped in design, with a short and long "L" leg 3' and 3". In the region of the short "L" leg 3', the bending element 2 is unilaterally monolithically joined with the support element 3, and is designed as a unilaterally securely clamped spring hanger. In addition, the bending element 2 with the longer "L" leg 1" of the support structure 3 encompasses a gap S. In the region of the bending element edge 2' that is frontally open-ended and free, an expansion body 1 of a piezoresistive material is provided between the support structure 3 and bending element 2', which locally joins the support element 3 with the bending element 2. The expansion body 1 can be disk or pin-shaped in design, and exhibits an expansion body longitudinal extension D that is preferably oriented orthogonally to the neutral fiber 6 of the bending element 2. This applies in particular with respect to a bending element 2 that is not displaced. Regardless of the design selected for the expansion body, care must be taken that the latter is dimensionally stable transverse to its expansion body longitudinal extension, so that load-induced transverse deformations can be precluded. This must also be observed in particular when the expansion body is made entirely out of a piezoresistive material.

If the piezoresistive transducer is subjected to external acceleration forces, the surface elasticity exhibited by the bending element 2 causes it to deform as shown on FIG. 1, during which it is assumed that the bending element 2 becomes displaced relative to the rigid support structure 3 by a measured variable 4 to be acquired. The displacement of the bending element 2 causes the piezoresistive expansion body 1 to expand along the expansion body longitudinal extension D, bringing about a maximum detectable change in electrical resistance within the expansion body.

According to the invention, the piezoresistive expansion body 1 is unsupported in design, from the standpoint that no additional support bodies or support layers are provided for helping to join in the support structure 3 and bending element 2 via the expansion body 1 preferably exclusively or predominantly being a piezoresistive material. However, this does not explicitly rule out having additional elements with a function other than mechanically supporting the piezoresistive expansion body 1 should be present in essentially the same location as the piezoresistive element. For example, these additional elements can be accessory elements that influence the mechanical properties of the framework. This is once again referenced in conjunction with the exemplary embodiment shown on FIG. 5.

It is also easily possible that, with the bending element not being displaced or deformed, the expansion body longitudinal extension D of the expansion body 1 and the neutral fiber 6 of the bending element 2 subtends an angle $\alpha$ that ranges between 45° and 135°, but preferably measures 90°.

Figure 4A:
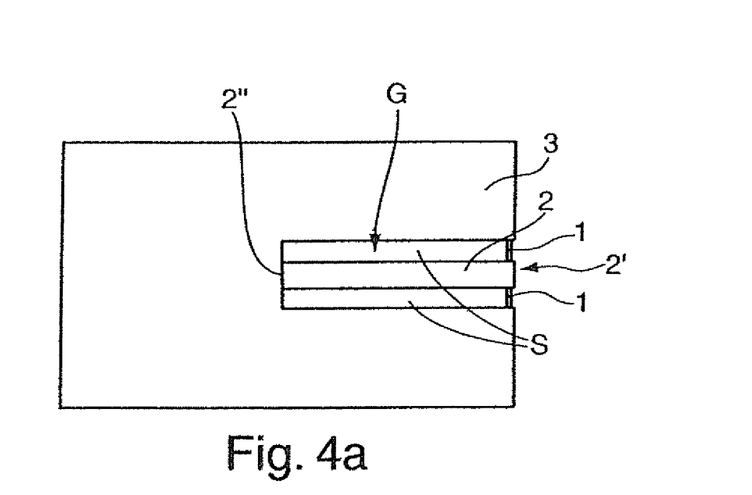
FIGS. 4a and b illustrate a piezoresistive transducer in accordance with the invention having a bending element trilaterally joined with the support element.
Figure 4B:
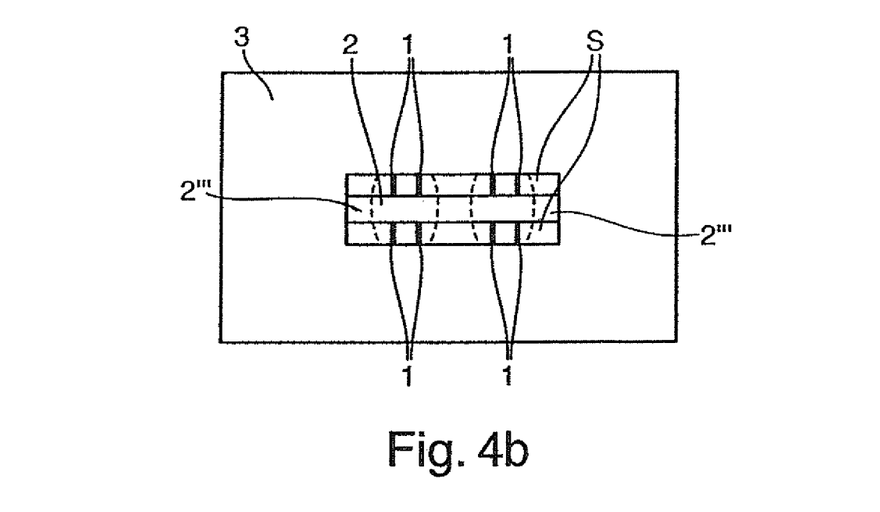

FIGS. 4a and b illustrate an embodiment of a piezoresistive transducer designed according to the invention. FIG. 4a is a longitudinal section through the transducer arrangement, while FIG. 4b shows a front view. It is assumed that the support structure 3 is square or cubical, and exhibits a rectangular trench structure G resembling a blind hole on a surface. A top view of the rectangular trench structure G is shown in FIG. 4b. A disk-shaped bending element 2 is incorporated centrally relative to the trench structure G. The trailing edge 2" and lateral edges 2'" are monolithically joined with the support structure 3, that is, with the interior walls of the trench structure G. The disk-shaped bending element 2 is centrally arranged inside the trench structure G, and its bending element upper side and bending element lower side each encompass a gap 5 with the support element 3. The bending element 2 also is open ended and free at its front face 2', which in the exemplary embodiment according to FIGS. 4a and b forms a flush seal with the surface of the support structure 3 with a top view of which is shown in FIG. 4b.

Provided in the region of the frontally open-ended leading edge 2' of the bending element 2 are expansion bodies 1 made out of a piezoresistive material, which are preferably designed as pins, and each locally join the support structure 3 with the bending element 2 at its leading edge 2'. The pin-shaped piezoresistive expansion bodies 1 are each arranged perpendicular to the upper and lower surface of the bending element 2, that is, perpendicular to the neutral fiber 6 (not delineated) of the bending element 2, and each span the gap S. In principle, any number of piezoresistive expansion bodies 1 can be selected which are desired. It is especially preferred to select piezoresistive expansion bodies 1 divided into groups of four, in which a group of four contains two expansion bodies that join the upper side of the bending element 2 with the support structure 3, as well as two expansion bodies 1 that join the lower side of the bending element 2 with the support structure 3, as may be determined from the top view according to FIG. 4b (see dashed ellipses). All piezoresistive expansion bodies 1 belonging to a group of four are electrically connected to yield a Wheatstone bridge circuit, with which the smallest changes in ohmic resistance can be ascertained. The piezoresistive transducer illustrated in FIGS. 4a and b is designed to acquire acceleration forces that are preferably oriented orthogonally to the surface extension of the disk-shaped bending element 2. See the measured variable acting in the direction of arrow 4.

Figure 5:
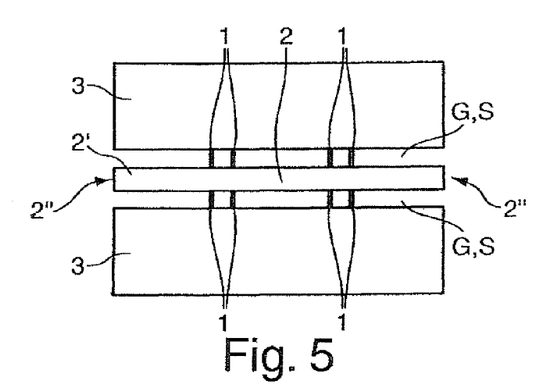
FIG. 5 is a piezoresistive transducer in accordance with the invention with a bending element unilaterally joined with the support element.

Another exemplary embodiment for a piezoresistive transducer is illustrated in FIG. 5, with a top view support structure 3, of the same orientation as FIG. 4b with a trench structure G incorporated in a similar manner to FIG. 4a. The bending element 2 illustrated in this embodiment is disk-shaped, and its open-ended and free leading frontal edge 2' is visible.

Further, the lateral edge located to the rear and opposite the leading frontal edge 2' is monolithically joined with the support structure 3 and the two lateral edges 2" of the bending element 2 of the leading frontal edge 2' are free and not joined with the support element 3. As a consequence, the bending element 2 must be regarded as a unilaterally clamped spring hanger, which causes the bending element 2 to have a far higher surface elasticity than in the case of the above exemplary embodiment of FIG. 4, in which the bending element is trilaterally and monolithically joined with the support element. Therefore, the embodiment illustrated on FIG. 5 exhibits a greater sensitivity in terms of detecting acceleration forces at a lower mechanical eigenfrequency than does the embodiment shown in FIGS. 4a and b.

In like manner, the piezoresistive expansion bodies 1 span the gap S of the trench structure G both between the upper surface of the bending element 2 with the support element 3 as well as between the lower surface of the bending element 2 with the support element 3. A sectional view of the embodiment illustrated on FIG. 5 is not provided, especially since it is identical to the sectional view according to FIG. 4a.

Figure 6:
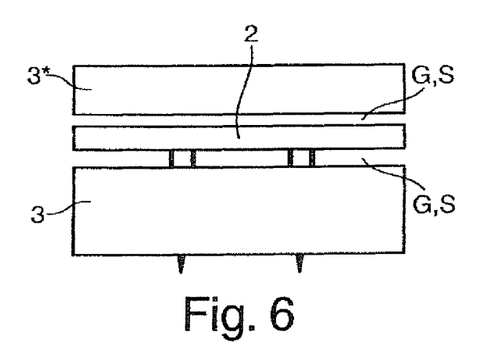
FIG. 6 is a piezoresistive transducer in accordance with the invention with a bending element unilaterally joined with the support element.

FIG. 6 illustrates another embodiment, which differs from the embodiment illustrated on FIG. 5 in that only the lower gap S of the trench structure G is spanned by the piezoresistive expansion body 1. The upper part 3* of the carrier element 3 is optional only, and can be readily omitted.

Figure 7:
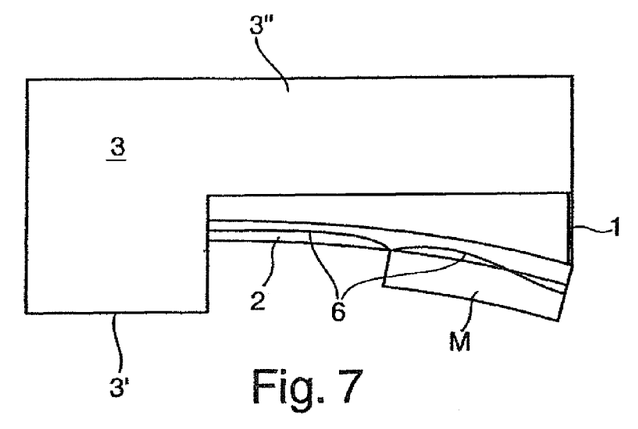
FIG. 7 shows a further modification of the exemplary embodiment illustrated above in FIG. 6.

FIG. 7 shows a further modification of the exemplary embodiment illustrated above in FIG. 6 which specifically is a longitudinal sectional view in which the frontal region of the bending element 2 incorporates an additional weight M, which diminishes the mechanical eigenfrequency of the piezoresistive transducer, and elevates the sensitivity in terms of detecting acceleration forces. While the additional weight M is also able to deform the neutral fiber 6 extending along the bending element 2, the pin-shaped piezoresistive expansion body 1 still extends largely perpendicular to the extension of the neutral fiber 6 which undergoes predominantly an expansion in the expansion body longitudinal extension when the bending element 2 is correspondingly displaced, as a result of which a maximum detectable change in resistance arises within the expansion body which can be acquired as a measured variable.

Aside from the specific exemplary embodiments described above for realizing a piezoresistive transducer according to the invention, a plurality of other modifications are possible without having to alter the geometric principle or the use of free and open-ended, piezoresistive expansion bodies made out of semiconductor material. For example, these modifications include adding another weight to any desired distribution or changing the shape of the support element or bending element, or the shape, number and location or spatial orientation of the piezoresistive expansion body. For example, a disk-shaped bending element along two opposing lateral edges can be monolithically joined with the support element, while the remaining two opposing lateral edges of the otherwise rectangular disk-shaped bending element are free and open-ended. Even in this type of embodiment, it is possible to provide piezoresistive expansion bodies on the two opposing, open-ended faces of the bending element in the form according to the invention, specifically with a perpendicular expansion body longitudinal extension of the neutral fiber of the disk-shaped bending element. Another embodiment provides a disk-shaped bending element bordered by a circumferential edge that is circular, elliptical, or n-sided, or a hybrid of the above geometries. The bending element is here permanently joined over its entire circumferential edge with the support element, and at least regionally spans the support element. At least one expansion body is situated between the support element and the bending element that spans the support element like a membrane. Such an embodiment is suitable for detecting higher or stronger acceleration forces.

The piezoresistive transducers designed according to the invention are suitable for an especially advantageous manner for acquiring accelerations or acceleration forces with a particularly pronounced and high sensitivity. To this end, use is advantageously made measuring acquired signals with a Wheatstone measuring bridge, as depicted with reference to the exemplary embodiment according to FIG. 4b or 5. The bridge circuit has two pairs of resistors or is formed as resistor cascades, which simultaneously are each exposed to an opposite but equal change in resistance during the deflection or deformation of the bending element, which enables an especially precise measurement of the change in ohmic resistance.

The material along with the dimensions and shape of the framework, in particular the support element, are preferably selected in such a way to give the piezoresistive transducer a high mechanical eigenfrequency, which is determined by the bending element. Preferred dimensions for the realization of piezoresistive transducers according to the invention range from tens to hundreds of μm. For example, the width of the bending element 2 in the exemplary embodiment according to FIG. 4b comprises a bending element thickness of 30 μm, a frontal edge length of 400 μm, as well as a bending element length extending more deeply into the trench structure of 200 μm. The bending element 2 along with the support structure 3 here encompass a respective gap width S of 20 μm. The rod or pin-shaped piezoresistive expansion bodies according to FIGS. 4, 5, 6 and 7 typically have a diameter of 1 to 2 μm, and have an expansion body longitudinal extension measuring at least the gap width of, for example, 20 μm or more.

In a preferred embodiment, the piezoelectric transducer serves as a high-g acceleration sensor for acquiring accelerations of 1,000 g or more, preferably of 100,000 g or more. In this case, properties relating to sensitivity and mechanical eigenfrequency are of crucial importance. The mechanical rigidity, and hence the mechanical eigenfrequency, selected for the sensor must be high enough that even rapidly variable and very strong accelerations can be measured. In order to reach an eigenfrequency ranging from 1 to 3 MHz, and thereby obtain a time resolution in the microsecond range for the measurement, the sensor must be fabricated on a microscale. The outer dimensions of the sensor lie within a range of 1×2×1 mm (L×W×H), and yield a weight of about 5 mg given the selection of silicon as the material. In order to achieve the highest possible sensitivity at the required eigenfrequency, the extensively described aspects of the invention must be taken into account in the process of designing the specific embodiments, in particular the geometric arrangement of the elements and the material selection. The support element, the bending element 2 and the at least one expansion body have a volume ranging from 1 to 10 mm$^3$ and preferably, from 1 to 3 mm$^3$.

When the sensor is to be used as a high-g acceleration sensor, the support element at least partially encompasses the at least one expansion body is directly attached to a measuring object, for example by way of adhesive bonding or some other fixed joint. When logging the measured values, the support element is thus exposed to the entire acquirable acceleration effect that triggers the corresponding deformation in the expansion body.

An especially preferable raw material for manufacturing a piezoresistive transducer according to the invention is silicon, which is processed in a suitable form using known manufacturing and processing methods from semiconductor technology.

REFERENCE LIST

1 Expansion body
2 Bending element
2' Leading and free edge of the bending element
2" Trailing edge of the bending element
2'" Lateral edges of the bending element
3 Support element
3' Short L-leg of the support element
3" Long L-leg of the support element
4 Exposure to external force, acceleration force
5 Additional weight
6 Neutral fiber
D Expansion body longitudinal extension
M Additional weight
G Trench structure
S Gap

The invention claimed is:

1. An acceleration sensor comprising:
a piezoresistive transducer including a framework with a support element on which a bending element is mounted and which experiences a deformation relative to the support element upon the application of a force, the framework having a neutral axis, extending along a longitudinal portion of the framework which is constant in length under the deformation, at least one expansion body comprising a piezoresistive material mounted on the framework which converts the deformation of the bending element into an electrically detectable resistance change, the support element and the bending element, at least in some areas thereof, defines a gap, at least one expansion body connects the support element and the bending element in the gap and the at least one expansion body extends longitudinally and intersects the neutral axis to subtend an angle within a range of 35° to 145°;
the support element, the bending element and the at least one expansion body are monolithically connected;
the bending element includes a plate bounded by side edges, one side edge being joined to the support element and at least one free side edge being free at an end thereof at or in a region of the at least one free side edge, the at least one expansion body is located between the support element and the bending element and the support element, the bending element and the at least one expansion body has a volume ranging from 1 to 10 mm$^3$ and is configured to detect accelerations of at least 1000 g.

2. The acceleration sensor according to claim 1, wherein:
the expansion body includes only piezoresistive material and is joined to the support element and to the bending element.

3. The acceleration sensor according to claim 1, wherein:
the bending element is joined to the support element by two opposite side edges and includes two side edges disposed at a free end of the bending element; and
the at least one expansion body at or in a region of the at least one free side edge is located between the support element and the bending element.

4. The acceleration sensor according to claim 2, wherein:
the bending element is joined to the support element by two opposite side edges and includes two side edges disposed at a free end of the bending element; and
the at least one expansion body at or in a region of the at least one free side edge is located between the support element and the bending element.

5. The acceleration sensor according to claim 1, wherein:
the bending element is joined to the support element at three side edges and includes another side edge which is a free end; and
the at least one expansion body is located between the support element and the bending element.

6. The acceleration sensor according to claim 2, wherein:
the bending element is joined to the support element at three side edges and includes another side edge has a free end; and
the at least one expansion body is located between the support element and the bending element.

7. The acceleration sensor according to claim 1, wherein:
the bending element has a top side and an underside;
the support element encloses the bending element at least in some regions with one gap being enclosed between the top side of the bending element and the support element and another gap being enclosed between the underside of the bending element and the support element;
the bending element including at least two opposite side edges with one of the side edges being joined to the support element and includes another side edge which is a free end; or
the bending element is permanently joined to the support element by two opposite side edges and includes an additional two side edges which are free ends; and
the at least one expansion body is located between the support element and the bending element at least in a region of at least one free side edge.

8. The acceleration sensor according to claim 2, wherein:
the bending element has a top side and an underside;
the support element encloses the bending element at least in some regions with one gap being enclosed between the top side of the bending element and the support element and another gap being enclosed between the underside of the bending element and the support element;
the bending element including at least two opposite side edges with one of the side edges being joined to the support element and includes another side edge which is a free end; or
the bending element is permanently joined to the support element by two opposite side edges and includes an additional two side edges which are free ends; and
the at least one expansion body is located between the support element and the bending element at least in a region of at least one free side edge.

9. The acceleration sensor according to claim 7, comprising:
at least two expansion bodies are located between the top side of the bending element and the support element;
the at least four expansion bodies are connected to form a wheatstone bridge.

10. The acceleration sensor according to claim 8, comprising:
at least two expansion bodies are disposed between the top side of the bending element and the support element;
the at least four expansion bodies are connected to form a wheatstone bridge.

11. An acceleration sensor comprising:
a piezoresistive transducer including a framework with a support element on which a bending element is mounted and which experiences a deformation relative to the support element upon the application of a force, the framework having a neutral axis, extending along a longitudinal portion of the framework which is constant in length under the deformation, at least one expansion body comprising a piezoresistive material mounted on the framework which converts the deformation of the bending element into an electrically detectable resistance change, the support element and the bending element, at least in some areas thereof, defines a gap, at least one expansion body connects the support element and the bending element in the gap and the at least one expansion body extends longitudinally and intersects the neutral axis to subtend an angle within a range of 35° to 145°;

the support element, the bending element and the expansion body are monolithically connected;

the bending element comprises a plate bounded by a circumferential edge;

the bending element is joined to the support element along the circumferential edge and spans the support element at least in some regions to form a diaphragm; and a volume of the support element, the bending element and the expansion body ranges from 1 to 10 mm$^3$, and is configured to detect accelerations of at least 1000 g.

12. The acceleration sensor according to claim 1, wherein:
the at least one expansion body is formed from only piezoresistive material and is joined both to the support element and to the bending element.

13. The acceleration sensor according to claim 11, wherein:
the at least one expansion body is formed from only piezoresistive material and is joined both to the support element and to the bending element.

14. The acceleration sensor according to claim 1, wherein:
the at least one expansion body expands in a direction of elongation which causes an electrically detectable change in resistance.

15. The acceleration sensor according to claim 11, wherein:
the at least one expansion body expands in a direction of elongation which causes an electrically detectable change in resistance.

16. The acceleration sensor according to any claim 1, wherein:
the support element, the bending element and the at least one expansion body are produced by semiconductor technology processing methods.

17. The acceleration sensor according to any claim 11, wherein:
the support element, the bending element and the at least one expansion body are produced by semiconductor technology processing methods.

18. The acceleration sensor according to claim 1, wherein:
the at least one expansion body consists of a piezoresistive material compressed along a longitudinal extension of the at least one expansion body and is dimensionally stable in a direction perpendicular to the at least one expansion body's longitudinal extension.

19. The acceleration sensor according to claim 11, wherein:
the at least one expansion body consists of a piezoresistive material compressed along a longitudinal extension of the at least one expansion body and is dimensionally stable in a direction perpendicular to the at least one expansion body's longitudinal extension.

20. The acceleration sensor according to claim 1, wherein:
the support element at least partially surrounds the bending element and the at least one expansion body and is connected over at least one outer side of the support element to an object subjected to an acceleration.

21. The acceleration sensor according to claim 11, wherein:
the support element at least partially surrounds the bending element and the at least one expansion body and is connected over at least one outer side of the support element to an object subjected to an acceleration.

22. The acceleration sensor according to claim 1, wherein:
the volume ranges from 1 to 3 mm$^3$.

23. The acceleration sensor according to claim 1, wherein:
the volume ranges from 1 to 3 mm$^3$.

* * * * *